Dec. 29, 1959  A. BLATTEL ET AL  2,919,128
ELECTRONIC TUBE ASSEMBLY JIGS
Filed Jan. 28, 1957  2 Sheets-Sheet 1

INVENTORS
ALFRED BLATTEL
MARVIN E. DUCHOVINER
BY Elmer J. Gorn
ATTORNEY

Dec. 29, 1959     A. BLATTEL ET AL     2,919,128
ELECTRONIC TUBE ASSEMBLY JIGS

Filed Jan. 28, 1957                                   2 Sheets-Sheet 2

INVENTORS
ALFRED BLATTEL
MARVIN E. DUCHOVINER
BY
Elmer J. Gorn
ATTORNEY

United States Patent Office 2,919,128
Patented Dec. 29, 1959

2,919,128

ELECTRONIC TUBE ASSEMBLY JIGS

Alfred Blattel, Newton, and Marvin E. Duchoviner, Framingham, Mass., assignors to Raytheon Company, a corporation of Delaware Application January 28, 1957, Serial No. 636,778

3 Claims. (Cl. 269—123)

This invention relates generally to mechanical apparatus adapted for use in assembling electronic tube structures, and more particularly, to a novel jig structure which facilitates the assembly of the component parts of the tube and insures that damage to the component parts during assembly thereof will be substantially eliminated.

Among the most difficult tasks in the assembly of an electron tube is the insertion of the top mica on a mount composed of the various tube components which have been previously inserted into the bottom mica. The cathode, the grid, the plate, and any other elements necessary for the particular type of tube under construction are at this stage floating, i.e., the components are supported only at one end by the bottom mica, while the opposite ends of the components are unsupported before the top mica is placed on these ends. At present, the person assembling the components is compelled to use a poker-like device to align each component in such a way that it will go into its correct hole in the top mica. This operation is now done essentially by touch rather than vision, since the top mica obstructs the assembler's view of the components beneath the top mica. It is obvious that this assembly task becomes increasingly more difficult with tubes which contain an increased number of components in the final structure. The possibility of damage to the components, for example, displaced grid turns, bowed support rods, and bent cathodes, is quite apparent under these circumstances. In addition, the assembler is often tempted to take the easy way out by forcing the components through the top mica, thereby damaging the top mica as well as the components which are forced therethrough. As a result, the present method of tube assembly produces an undesirably large percentage of broken or mechanically weak tubes.

Accordingly, the present invention is directed toward a new type of tube-assembly apparatus which effectively eliminates the difficulties involved in the method outlined above. The apparatus comprises a unit mount jig which is provided with a positive cathode-to-bottom mica insertion guide in order to avoid the unnecessary damage to the mica previously caused by excessive probing. The component parts of the tube are accurately mounted in the bottom mica, which is supported on a portion of the apparatus, and before the top mica is inserted, a pair of accurately-machined blades grasp and align the floating ends of the components so that the top mica may be easily placed into position without damage to either the components or to the top mica. Since the utilization of the device of the present invention eliminates the probing and handling of the components in order to slide them into the respective openings in the micas, the chance of damage to the components by unskillful assemblers is made substantially nonexistent, and tubes which are mechanically stronger are thereby achieved. In addition, the amount of skill necessary to assemble a tube is considerably less than was heretofore necessary with the result that tubes may be more rapidly and efficiently produced.

The invention will be better understood as the following description proceeds, taken in conjunction with the accompanying drawing wherein:

Fig. 3 is an enlarged fragmentary perspective view of the mounting bar and carriage of Fig. 1 showing the tube components as they are positioned on the mounting bar when the blades are closed to grasp the tube components.

Figure 1:
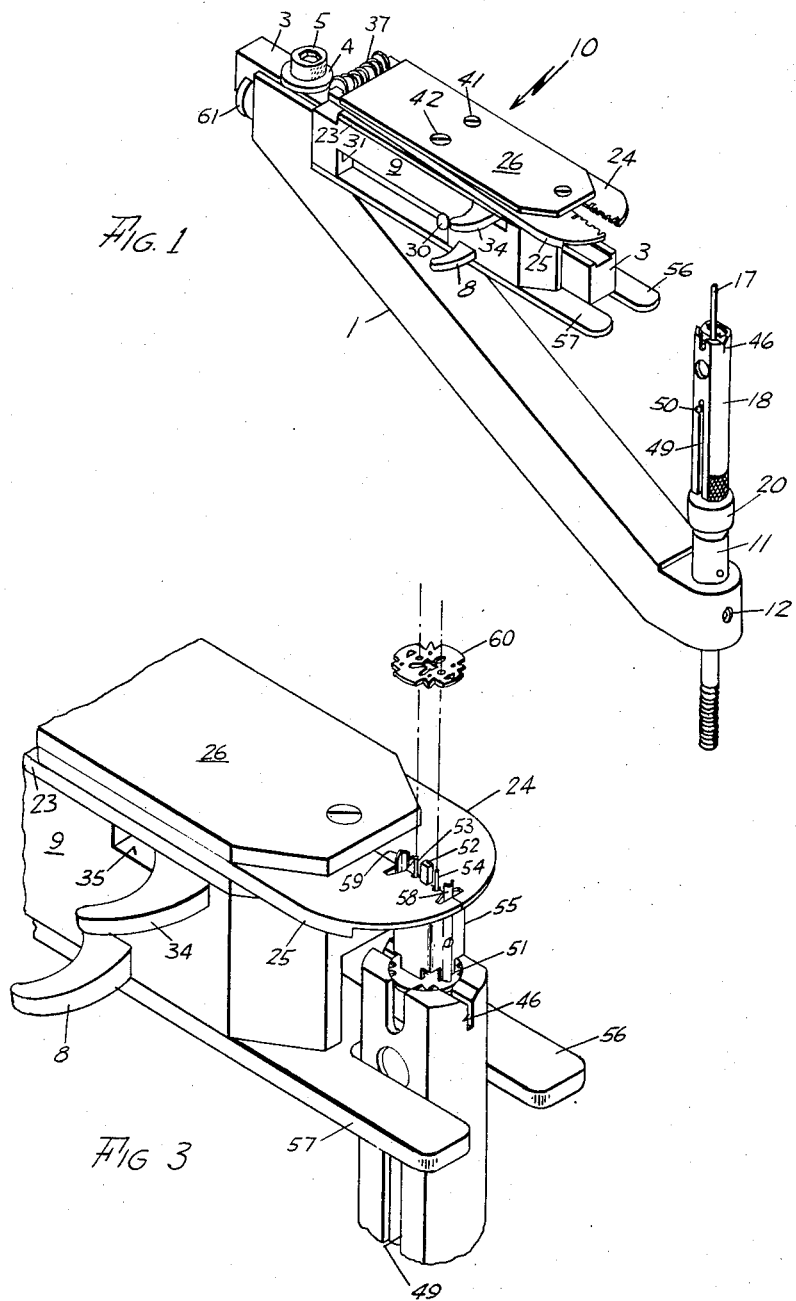
Fig. 1 is an elevational perspective view of a device according to the invention.
Figure 2:
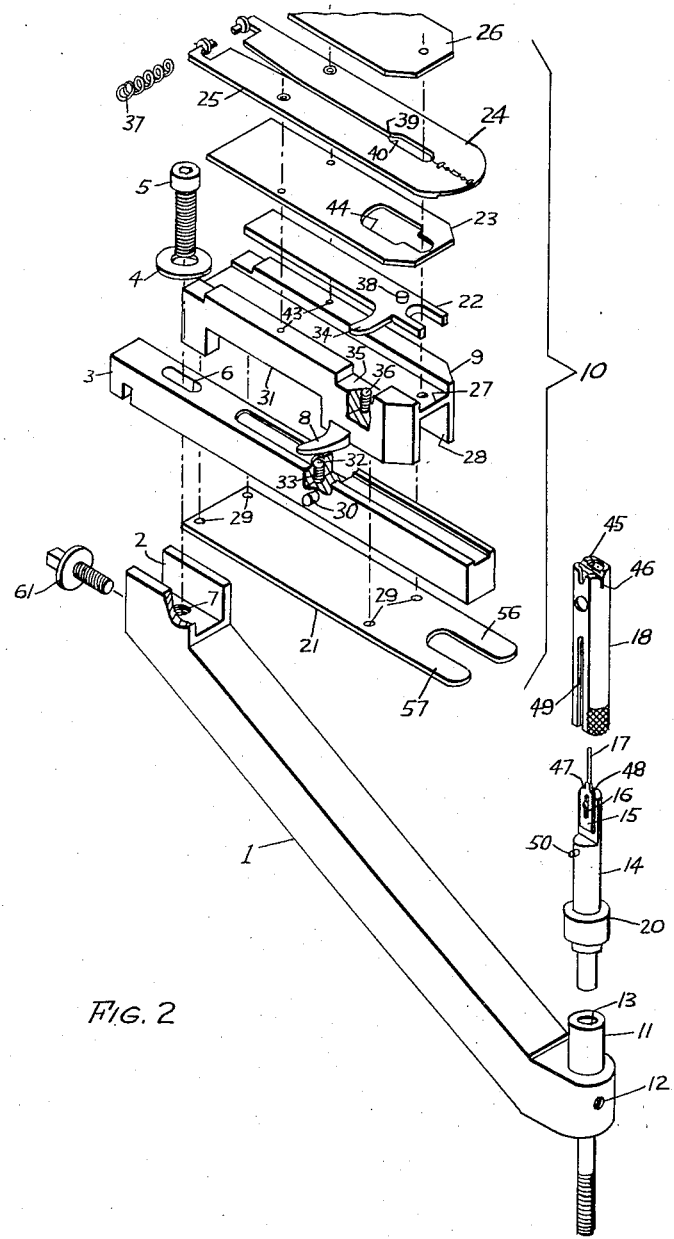
Fig. 2 is an exploded view of the device of Fig. 1 showing the relationship of the parts which comprise the jig.

Referring now to the drawing and more particularly to Figs. 1 and 2 thereof, there is shown a jig structure in accordance with the present invention. As shown in the figures, the jig comprises an angle bracket 1 which may be made of any suitable metal as, for example, cast bronze. The top end of angle bracket 1 is provided with a channel 2 in which a slide-bar 3 is rigidly supported through the medium of the washer 4 and the screw 5, which passes through an elongated hole 6 in the slide-bar 3, and is screwed into a threaded hole 7 in the floor of channel 2. The slide-bar 3 has mounted thereon a carriage structure denoted generally by the reference numeral 10, said carriage structure being manually movable along the slide-bar 3 by actuation of the trigger 8 fixedly attached to a lower part of the slide 9, which comprises part of the overall carriage structure. In order to provide means for mounting the components of the tube under construction, the lower end of angle bracket 1 is provided with a holding screw 11, which passes through a hole in the angle bracket 1, and is rigidly attached thereto by the set screw 12. As shown, the lower end of the holding screw 11 is threaded to accommodate a washer and holding nut (not shown) in order that the whole jig assembly may be fixedly attached to a work-bench, as desired. The top end of the holding screw 11 has a hole 13 therein adapted to receive one end of a mounting pin 14. Attached to the other end of the mounting pin 14 is a suitably dimensioned grid stop 15 provided with an elongated hole 16 in order to allow vertical adjustment of the grid stop with relation to the mounting pin 14. The grid stop 15 has a narrow finger-like projection 17 extending upwardly therefrom, which is designed to receive the cathode of the particular tube under construction. A mounting bar 18, adapted to support the bottom mica of the tube, slides over the top end of the mounting bar 14 and is supported on the collar 20, which may form an integral part of the mounting pin 14.

As shown most clearly in the exploded view of Fig. 2, the overall carriage structure 10 comprises a slide 9, a centering plate 21, a blade actuator 22, spacer plate 23, a plurality of blades 24 and 25, and a top cover 26. The slide 9 comprises a machined metal block having a first channel 27 in the top surface thereof, and having a second channel 28 in its bottom surface. The slide 9 is positioned on the slide-bar 3 with the slide-bar residing in the lower channel 28. The slide 9 is held in place on the slide-bar 3 by the centering plate 21, which is attached to the bottom surface of the slide 9 in any convenient manner, as by means of a plurality of screws which pass through the holes 29 in the centering plate 21 and screw in appropriately-positioned tapped holes in the under surface of slide 9. The extent of backward and forward motion of the slide 9 along the slide-bar 3, when suitable directional pressure is applied to the trigger 8, is limited by the dowel 30, which acts as a positive stop when it contacts the respective rear and forward vertical walls of a pair of rectangular cut out portions 31 located in the opposite side walls of the slide 9. In order to facilitate easy movement of the slide 9 along the slide-bar 3, the slide-bar 3 has a central hole therein which contains a pair of ball bearings 32 with a spring 33 inserted between them so that the slide 9 and the centering plate 21 will each ride on one of the ball bearings 32.

The blade actuator 22 is slidably positioned in the upper channel 27 of the slide 9 and is backwardly and forwardly movable therein by actuation of the trigger 34 to an extent limited by the contact of the trigger 34 with the front and rear vertical walls of the rectangular cut out portion 35, in which the trigger moves. In a manner similar to that described with respect to the slide 9 and the centering plate 21, the trigger 34 rides on a spring-loaded ball bearing 36 positioned in a hole in the floor of the cut-out portion 35, so as to also provide for relatively easy movement of the blade actuator. When the trigger 34, and hence, the blade actuator 22, are moved to their forward positions, as shown in Fig. 3, the blades 24 and 25 close under the action of a compression spring 37, which may be removably inserted between the rear ends of the blades 24 and 25. In order to provide means for opening the blades when the blade actuator is retracted in the channel 27 by backward movement of trigger 34, the top surface of blade actuator 22 has an appropriately-positioned pin 38 protruding vertically therefrom. The pin 38 is so positioned that it will engage and ride upon the cammed surface 39 of blade 24 and the cammed surface 40 of blade 25, thereby forcing the forward ends of the blades apart by pivoting each of the blades about the screws 41 and 42, which pass through the aligned holes in the top cover 26, the blades 24 and 25, the spacer plate 23, and then engage the tapped holes 43 in the top surface of slide 9. The spacer plate 23, which rests on the top surface of slide 9 and supports the blades 24 and 25, is provided with a hole 44 which allows the pin 38 to extend therethrough in order to engage the cammed surfaces of the blades.

As shown most clearly in Figs. 1 and 2, the top surface of the mounting bar 18 is recessed, as at 45, in order to receive and retain a body of insulating material, such as mica, which insulating material has been preformed with accurately-spaced holes designed to accommodate and support the various electrodes which will comprise the completed tube structure. The recessed surface of the mounting bar 18 is further provided with a transverse slot 46 in order to allow the bottom of the grid rods to extend therethrough and come to rest on the shoulders 47 and 48 of the grid stop or insert 15, as well as to allow the finger-like cathode guide 17 to extend upwardly from the recessed surface. The vertical slot 49 in the front surface of the mounting bar 18 engages the guide pin 50 when the mounting bar is fitted over the mounting pin 14 to insure that the mounting bar and the mounting pin will always be in correct operational position with respect to each other. As shown in Fig. 3, for the case of a triode, when the mounting bar 18 is in place, a bottom mica 51 may be inserted over the finger-like projection 17 and guided to rest in the recessed portion 45 of the mounting bar 18. A cathode 52 may then be slid down the projection 17 and into its proper hole in the bottom mica. The grid may then be slipped over the cathode with the bottom ends of the grid rods 53 and 54 being inserted into the proper holes in the bottom mica. Similarly, the plate 55 may then be slipped over the grid with the projections provided at the bottom end thereof also coming to rest in the holes provided in the bottom mica. At this point, it should be noted that any additional components of the particular tube type under construction would also be inserted into the proper holes in the bottom mica.

With the tube components so positioned, the carriage structure 10 is pushed forward by the assembler, whereby the fingers 56 and 57 of the centering plate 21 engage the opposite outer plane surfaces of the mounting bar 18 in order to hold the mounting bar and the components resting thereon in a stationary position free from rotation about the vertical axis of the mounting bar. It should be noted that while the carriage 10 is being moved forward in response to pressure on trigger 8, the staggered trigger 34 should be in its backwardmost position so that blades 24 and 25 are open and will not contact the upper ends of the tube components. The trigger 34 is then pushed forward in order to cause the blades 24 and 25 to close and firmly grasp the top ends of the cathode 52, grid rods 53 and 54, and plate projections 58 and 59. The grasping jaws of the blades 24 and 25 are accurately machined so that the depressions therein grasp and align the upper ends of the electrodes in substantially the same plane as the lower ends, and in proper relation to the electrode-receiving holes of the top mica, and also provide the proper spacing desired between the electrodes of the particular tube type under construction. The top mica 60 may then be easily placed on the free ends of the tube components without any need for probing in order to insert the ends of the components into the proper holes in the top mica.

As a further feature of the present invention, adjustment of the slide-bar 3 with respect to angle bracket 1 may be conveniently accomplished by loosening the screw 5 and rotating the adjusting screw 61 provided at the rear of the top end of the angle bracket.

It can thus be seen that the novel jig apparatus of the present invention provides a rapid and efficient means of assembling an electron tube. Although there has been shown what is considered to be a preferred embodiment of the present invention, various adaptations and modifications thereof may be made without departing from the spirit and scope of the invention as set forth in the appended claims. For exampe, the shape and machining of the jaws of the grasping blades may be altered to accommodate any electrode arrangement of the tube being made. Similarly, the shape of the grid stop or insert 15 may be changed with tube type, and the recessed top surface of the mounting bar 18 may also assume various contours. In addition, movement of the triggers 8 and 34 could be made automatic rather than by the manual operation described.

What is claimed is:

1. Electronic tube-making apparatus comprising a support member carrying adjustable means for mounting one end of a plurality of tube components, a vertically adjustable stop member having a finger-like projection extending upwardly above the surface of said mounting means for receiving one of said components in telescoping relation, said stop member further having a plurality of shoulders adapted to support the mounted end of said one component and also the mounted ends of other of said components, means supported by said support member and carrying slidable means which engage said mounting means for rigidly holding said mounting means in a substantially stationary position, and means also carried by said slidable means for clamping the opposite ends of said components in substantially the same vertical plane as the mounted ends during the engagement of said slidable means and said mounting means.

2. Apparatus for use in assembling electronic tube structures comprising a support member carrying an adjustable mounting bar adapted to receive and retain a first body of insulating material, said insulating material being adapted to receive one end of a plurality of tube components, a stop member having at least one finger-like projection extending upwardly above the surface of said mounting bar for receiving a tube component in telescoping relation, said stop member further having a plurality of shoulders adapted to support one end of the component mounted over said finger-like projection and one end of other of said components of said tube, said stop member being vertically adjustable whereby the position of all the tube components held thereby may be varied with respect to said mounting bar, a slidable carriage supported by said support member and having clamping fingers adapted to engage and hold said mounting bar stationary, said carriage structure also including a plurality of blade elements for rigidly holding the free ends of said tube components while a second body of insulating material is placed thereon during the engagement of said clamping fingers and said mounting bar.

3. Apparatus for use in assembling electronic tube structures comprising a support member carrying a mounting pin, a mounting bar positioned over said mounting pin and carried thereby, the combined mounting pin and mounting bar being vertically adjustable, a vertically adjustable stop member attached to said mounting pin and having at least one finger-like projection for receiving at least one of said tube components in telescoping relation, said stop member further having a plurality of shoulders adapted to support the ends of said components received in a first body of insulating material, and means extending from said support member and operatively cooperating with said mounting bar for rigidly holding the opposite ends of said tube components and said mounting bar in a substantially stationary position while a second body of insulating material is placed thereon.

References Cited in the file of this patent

UNITED STATES PATENTS

| | | |
|---|---|---|
| 2,425,127 | Schaefer | Aug. 5, 1947 |
| 2,644,998 | Klinkert et al. | July 14, 1953 |
| 2,721,374 | Pilas | Oct. 25, 1955 |
| 2,760,254 | Wolke | Aug. 28, 1956 |

FOREIGN PATENTS

| | | |
|---|---|---|
| 144,356 | Australia | Nov. 30, 1951 |